Patented Feb. 10, 1953

2,628,160

UNITED STATES PATENT OFFICE 2,628,160

SCULPTURING GLASS

Stanley Donald Stookey, Corning, N. Y., assignor to Corning Glass Works, Corning, N. Y., a corporation of New York No Drawing. Application August 30, 1951,
Serial No. 244,477

38 Claims. (Cl. 41—45)

This invention relates to the manufacture of glass articles bearing surface designs in intaglio or in relief or provided with perforations or filigrees.

Surface designs of this type can be generally produced to a limited extent in preformed glass articles by mechanical grinding, or by acid-etching wherein the glass surface is coated with an acid-insoluble resist, such as wax, selected portions of the resist are removed to form a design therein, and the design is etched into the exposed glass surface by treatment with hydrofluoric acid. Mechanical grinding, if sufficiently prolonged, can perforate the glass and in this manner individual holes extending through the glass and filigrees of the simplest type can be produced. For purposes requiring little or no accuracy of dimension, relatively large holes are sometimes melted through a glass article by means of a sharp flame or an electric arc. Holes and coarse filigrees of simple types may also be formed in a glass article during its fabrication by molding the molten glass or by molding and sintering powdered glass.

The mechanical grinding of glass is a slow and laborious process and the production of anything more than the simplest design thereby requires a high degree of manual skill. Moreover, the minimum dimensions of lines, depressions and holes, and the intricacy of the designs which may thus be produced in glass, are limited by the relatively large size of the tools which must be employed and the brittleness of glass, as well as by the skill of the operator. Acid-etching, on the other hand, although more facile than mechanical grinding and fairly accurate for the shallow cutting of lines, lacks accuracy in deep cuts and is generally unsatisfactory for producing filigrees on account of the unavoidable undercutting by the acid. The degree of intricacy of design obtainable by acid-etching is not particularly high because of such undercutting, and also because of the difficulty of accurately removing the resist to form the design. Designs formed in the glass by melting or molding it are obviously coarse and simple or crude compared to those which are obtainable by grinding or etching.

I have now discovered a method of sculpturing or selectively etching a preformed glass article which comprises forming in a selected portion of the glass a design comprising crystallites selected from the class consisting of a lithium silicate, barium disilicate, and an alkali metal fluoride, while leaving the remaining portion of the glass unaffected, and treating the article with a dilute aqueous solution of hydrofluoric acid to dissolve one of such portions while leaving the other portion substantially unchanged.

This new method is predicated upon my discovery that an article composed of a glass containing a clear portion and an opacified or light diffusing portion comprising opacifying or light diffusing crystallites of a lithium silicate or barium disilicate or an alkali metal fluoride exhibits a substantial difference between the solubilities of such portions in dilute hydrofluoric acid, hereinafter referred to as the solubility differential of the glass, whereby one of such portions can be completely dissolved while the other portion is only slightly affected. The more soluble portion, when dissolved, leaves an exactly corresponding void in the article, and if such portion extends completely through the glass, its removal leaves a hole through the article. By this means designs and filigrees can easily and accurately be carved in the glass without the objectionable undercutting which is characteristic of conventional acid-etching where no solubility differential exists within the glass.

The solubility differential of such a glass can be determined by preparing a small polished plate thereof having an opacified portion and a clear or unopacified portion. Such plate is immersed in a stirred solution of dilute hydrofluoric acid (for example, 10% by weight) at room temperature and at given (for example, 15-minute) intervals the plate is removed, rinsed with water, and the thicknesses of the opacified portion and the clear portion are measured. The ratio of the change in thickness of each portion to its etching time is taken as the etching rate of that portion. The ratio of the etching rates of the opacified and the clear portions is the solubility differential of the glass.

For the present purpose opacified designs are preferably and most accurately formed in glass articles by known photographic methods, although other methods are also suitable though less accurate. Such photographic methods utilize a photosensitively opacifiable glass, that is, a glass in which exposure to short-wave radiations, such as ultraviolet radiations, brings about an invisible change whereby the irradiated areas are capable of heat-developed opacification, while nonirradiated areas remain substantially unchanged on heating.

Such a photographic method, in which the resulting opacified image comprises opacifying crystallites of lithium disilicate and a photosensitively opacifiable glass suitable therefor are disclosed in my prior Patent No. 2,515,940, issued July 18, 1950. Upon exposure of this glass, which is a silicate glass containing 10-25% $Li_2O$ and a photosensitive metal comprising gold, silver or copper equivalent to 0.004-0.05% Au, 0.025-0.3% AgCl or 0.04-1% $Cu_2O$, to short-wave radiations in the conventional manner through a suitable photographic negative having the desired design, a latent image is formed which is converted to an opacified image by heating the glass at a temperature below the softening point for a time sufficient to cause precipitation of crystallites of lithium disilicate in the exposed portions of the glass. In such glasses the opacified portion containing crystallites of lithium disilicate is more soluble in dilute hydrofluoric acid than the clear portion of the glass. The opacified portion of the glass is consequently thereby removed when the article is immersed in dilute hydrofluoric acid while the clear portion remains substantially unchanged.

A similar method utilizes a reduced photosensitively opacifiable glass comprising essentially 70-85% $SiO_2$, the indicated proportion of at least one alkali metal oxide selected from the group consisting of 9-15% $Li_2O$, up to 8% $Na_2O$, up to 8% $K_2O$ and up to 8% of a mixture of $Na_2O$ and $K_2O$, the selected alkali metal oxide including $Li_2O$, the total alkali metal oxide content being 9% to 23%, and 0.001-0.20% of silver computed as AgCl, such essential constituents totaling at least 84%. Additional details as to the characteristics of these glasses, compositionwise and otherwise, are disclosed in my pending application Serial No. 244,478, filed concurrently herewith. Advantageously such glasses include up to 10% $Al_2O_3$ and/or up to 0.05% $CeO_2$. In addition such glasses containing $K_2O$ possess a greater solubility differential than those containing no $K_2O$, and the solubility differential is still greater for those glasses which contain $K_2O$ but no $Na_2O$. Preferably the present glasses consist essentially of 78-83% $SiO_2$, 10-13% $Li_2O$, 2-5% $K_2O$, up to 10% $Al_2O_3$, 0.001-0.020% of silver computed as AgCl, and 0.005-0.05% $CeO_2$. The glasses utilized in this method possess a higher degree of photosensitivity than the glasses disclosed in my Patent No. 2,515,940. They are particularly suitable for use in the present invention because they include compositions producing opacified images comprising crystallites of lithium monosilicate which is considerably more soluble in dilute hydrofluoric acid than lithium disilicate, thus greatly improving the above referred to method of sculpturing or selectively etching glass articles.

Another photographic method, in which the resulting opacified image comprises crystallites of barium disilicate and a photosensitively opacifiable glass which is suitable therefor, are disclosed in my prior Patent No. 2,515,941, issued July 18, 1950. This glass comprises 50-65% $SiO_2$, 5-15% $Na_2O$, $K_2O$ or a mixture of $Na_2O$ and $K_2O$, 15-45% BaO, gold equivalent to 0.004-0.05% Au and up to 0.05% $CeO_2$. In such glasses the opacified portion containing barium disilicate is less soluble in dilute hydrofluoric acid than the clear portion of the glass on account of the formation of insoluble fluorides which mask and hinder the reaction. In such articles then the clear portion of the glass is dissolved to leave the opacified portion substantially unchanged.

Still another photographic method, in which the opacified image comprises crystallites of an alkali metal fluoride, and a photosensitively opacifiable glass which is suitable therefor, are disclosed in my prior Patent No. 2,515,943, issued July 18, 1950. This glass comprises 55-75% $SiO_2$, 12-18% of $Na_2O$ or a mixture of $Na_2O$ and $K_2O$ or a mixture of $Na_2O$ and $Li_2O$, 2-12% $Al_2O_3$, 0.001% to less than 0.01% of gold computed as Au, 0.005-0.05% $CeO_2$ and 1.8-2.4% of analytically determined fluorine. For forming an opacified image in such glass, the article thereof, after exposure to short-wave radiations through a negative, is heated from 5 minutes to 6 hours at a temperature within the range extending from 100° C. below the softening point of the glass up to 50° C. above the softening point, cooled below 520° C. and reheated at a temperature between 540° and 700° C. In such glasses the opacified portion containing an alkali metal fluoride is more soluble in dilute hydrofluoric acid than the clear portion of the glass. The opacified portion is therefore removed, while the clear portion remains substantially unchanged.

Another photographic method in which the opacified image comprises crystallites of an alkali metal fluoride, and a photosensitively opacifiable glass which is suitable therefor, are disclosed in my pending application Serial No. 172,596, filed July 7, 1950. This glass is similar to the glass disclosed in my Patent No. 2,515,943 but contains as the photosensitive metal silver equivalent to 0.0001-0.3% AgCl, and is prepared from a batch containing a mild reducing agent. For forming an opacified image in such glass the article thereof, after exposure to short-wave radiations through a negative, is heated for a time and at a temperature varying from about one minute at about 50° C. above the softening point of the glass to about one hour at about 150° C. below the softening point, cooled below about 500° C. and reheated to a temperature not lower than about 100° C. below the softening point.

A non-photographic method of suitably forming a selectively opacified glass article for the present method is disclosed in Patent No. 2,292,684, issued August 11, 1942. Such method comprises coating selected areas of an article composed of a thermally opacifiable glass with a thermal resist comprising a heat-insulating material of low thermal conductivity, such as infusorial earth bonded with a soluble salt such as a halide of an alkaline earth metal which is infusible at the opacifying temperature of the glass, heating the article at a temperature and for a time sufficient to opacify the unprotected areas, and washing off the thermal resist. Any thermally opacifiable glass may be employed in such method which, on suitable heat treatment, will precipitate opacifying crystallites of alkali metal fluoride. However, such glass preferably should not contain large amounts (not over 3%) of metal oxides which form insoluble fluorides, such as oxides of the metals of the second periodic group and lead, because the formation of such fluorides decreases the solubility of the glass.

Another non-photographic method of forming a selectively opacified glass article is disclosed in Patent No. 2,339,975, issued January 25, 1944. Such method comprises molding an article of the above-mentioned fluoride-containing thermally opacifiable glass, and before it has cooled into the nuclei-forming temperature range, contacting a selected area of the surface with a cold metallic surface shaped in a desired design until the surface so contacted has cooled into the nuclei-forming temperature range and forms nuclei of alkali metal fluoride, whereupon the cooled surface is reheated to cause growth of such nuclei to visible dimensions and the article is thereafter cooled.

Glass articles having selectively opacified portions and designs, and preferably such articles as are formed by the photographic methods described above, may be differentially acid-etched in accordance with the present invention by immersing them in a stirred dilute solution of hydrofluoric acid until the more soluble portion of the article is removed. In general, an increase in the concentration or temperature of the acid solution tends to decrease the solubility differential of the glass; and I find that it is generally preferable to carry out the present procedure at about room temperature with a hydrofluoric acid solution containing not more than about 20% by weight of HF. As illustrative of my invention, with articles prepared in accordance with the photographic method described above as utilizing glasses particularly suitable for the present invention because they include compositions producing opacified images comprising crystallites of lithium monosilicate, such glasses being set forth in greater detail in my pending application Serial No. 244,478, my investigations have shown that with other conditions remaining constant, the solubility differential varies with the acid concentration in the following manner: For an acid concentration of 1% by weight of HF it is 50 to 1; for a concentration of 10% it is 30 to 1; and for a concentration of 20% it is 13.5 to 1.

By means of the new method according to this invention, when the opacified design in the glass is formed photographically, glass articles can be produced with three-dimensional surface designs in intaglio or relief having sculptured or raised and depressed areas exactly corresponding to the highlights and lowlights of the photographic negative from which the design was "printed" in the glass. Designs can be cut part-way or entirely through the glass, at controlled angles and with the shape defined in all three dimensions. Holes extending entirely through the glass and having any desired shape can thus be made. The minimum diameter of such holes is less than 25 mils and their wall thickness or distance between adjacent holes may, if desired, be less than 10 mils.

What I claim is:

1. The method of sculpturing or selectively etching a glass article, which comprises forming in a selected portion of the glass a design comprising crystallites selected from the class consisting of a lithium silicate, barium disilicate and an alkali metal fluoride, while leaving the remaining porton of the glass unaffected, and treating the article with a dilute aqueous solution of hydrofluoric acid to dissolve one of such portions while leaving the other portion substantially unchanged.

2. The method of sculpturing or selectively etching a glass article, which comprises forming in a selected portion of the glass an opacified design comprising opacifying crystallites selected from the class consisting of a lithium silicate, barium disilicate and an alkali metal fluoride, while leaving the remaining portion of the glass clear and unopacified, and treating the article with a dilute aqueous solution of hydrofluoric acid to dissolve one of such portions while leaving the other portion substantially unchanged.

3. A glass article having a relief, intaglio, filigree or the like design and made by the method of claim 2.

4. The method of sculpturing or selectively etching an article comprising a body made of a transparent photosensitively opacifiable glass, which comprises exposing such article to short-wave radiations to form in a selected portion of the glass body a latent photographic image, heating the article to convert the latent image to an opacified image comprising opacifying crystallites selected from the class consisting of a lithium silicate, barium disilicate and an alkali metal fluoride, while leaving the remaining portion of the glass clear and unopacified, and treating the article with a dilute aqueous solution of hydrofluoric acid to dissolve one of such portions while leaving the other portion substantially unchanged.

5. A glass article having a relief, intaglio, filigree or the like design and made by the method of claim 4.

6. The method of sculpturing or etching a glass article, which comprises forming in a selected portion of the glass an opacified design comprising opacifying crystallites selected from the class consisting of a lithium silicate and an alkali metal fluoride, while leaving the remaining portion of the glass clear and unopacified, and treating the article with a dilute aqueous solution of hydrofluoric acid to dissolve the opacified portion while leaving the clear portion substantially unchanged.

7. A glass article having a relief, intaglio, filigree or the like design and made by the method of claim 6.

8. The method of sculpturing or selectively etching a glass article comprising a body made of a transparent photosensitively opacifiable glass, which comprises exposing such article to short-wave radiations to form in a selected portion of the glass body a latent photographic image, heating the article to convert the latent image to an opacified image comprising opacifying crystallites selected from the class consisting of a lithium silicate and an alkali metal fluoride, while leaving the remaining portion of the glass clear and unopacified, and treating the article with a dilute aqueous solution of hydrofluoric acid to dissolve the opacified portion while leaving the clear portion substantially unchanged.

9. A glass article having a relief, intaglio, filigree or the like design and made by the method of claim 8.

10. The method of sculpturing or selectively etching a glass article, which comprises forming in a selected portion of the glass an opacified design comprising opacifying crystallites of an alkali metal fluoride while leaving the remaining portion of the glass clear and unopacified and treating the article with a dilute aqueous solution of hydrofluoric acid to dissolve the opacified portion while leaving the clear portion substantially unchanged.

11. A glass article having a relief, intaglio, filigree or the like design and made by the method of claim 10.

12. The method of sculpturing or selectively etching a glass article comprising a body made of a transparent photosensitively opacifiable glass, which comprises exposing such article to short-wave radiations to form in a selected portion of the glass body a latent photographic image, heating the article to convert the latent image to an opacified image comprising opacifying crystallites of an alkali metal fluoride while leaving the remaining portion of the glass clear and unopacified, and treating the article with a dilute aqueous solution of hydrofluoric acid to dissolve the opacified portion while leaving the clear portion substantially unchanged.

13. A glass article having a relief, intaglio, filigree or the like design and made by the method of claim 12.

14. The method of sculpturing or selectively etching a glass article comprising a body made of a transparent photosensitively opacifiable glass, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the clear portion substantially unchanged.

15. A glass article having a relief, intaglio, filigree or the like design and made by the method of claim 14.

16. The method of sculpturing or selectively etching a glass article comprising a body made of a transparent photosensitively opacifiable glass, which comprises exposing such article to short-wave radiations to form in a selected portion of the glass body a latent photographic image, heating the article to convert the latent image to an opacified image comprising opacifying crystallites of barium disilicate while leaving the remaining portion of the glass clear and unopacified, and treating the article with a dilute aqueous solution of hydrofluoric acid to dissolve the clear portion while leaving the opacified portion substantially unchanged.

17. A glass article having a relief, intaglio, filigree or the like design and made by the method of claim 16.

18. The method of sculpturing or selectively etching a glass article comprising a body made of a transparent photosensitively opacifiable glass, which comprises exposing such article to short-wave radiations to form in a selected portion of the glass body a latent photographic image, heating the article to convert the latent image to an opacified image comprising opacifying crystallites of lithium monosilicate while leaving the remaining portion of the glass clear and unopacified, and treating the article with a dilute aqueous solution of hydrofluoric acid to dissolve the opacified portion while leaving the clear portion substantially unchanged.

19. A glass article having a relief, intaglio, filigree or the like design and made by the method of claim 18.

20. The method of sculpturing or selectively etching a glass article comprising a body made of a transparent photosensitively opacifiable glass, which comprises exposing such article to short-wave radiations to form in a selected portion of the glass body a latent photographic image, heating the article to convert the latent image to an opacified image comprising opacifying crystallites of lithium disilicate while leaving the remaining portion of the glass clear and unopacified, and treating the article with a dilute aqueous solution of hydrofluoric acid to dissolve the opacified portion while leaving the clear portion substantially unchanged.

21. The method of sculpturing or selectively etching an article comprising a body made of a reduced, transparent, photosensitively opacifiable glass comprising essentially 70–85% $SiO_2$, the indicated proportion of at least one alkali metal oxide selected from the group consisting of 9–15% $Li_2O$, up to 8% $Na_2O$, up to 8% $K_2O$ and up to 8% of a mixture of $Na_2O$ and $K_2O$, the selected alkali metal oxide including $Li_2O$, the total alkali metal oxide content being 9% to 23%, and 0.001% to 0.020% of silver computed as AgCl, the essential constituents totaling at least 84%, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the other portion substantially unchanged.

22. A glass article having a relief, intaglio or the like design and made by the method of claim 21.

23. The method of sculpturing or selectively etching an article comprising a body made of a reduced, transparent photosensitively opacifiable glass comprising essentially 70–85% $SiO_2$, the indicated proportion of at least one alkali metal oxide selected from the group consisting of 9–15% $Li_2O$, up to 8% $Na_2O$, up to 8% $K_2O$ and up to 8% of a mixture of $Na_2O$ and $K_2O$, the selected alkali metal oxide including $Li_2O$, the total alkali metal oxide content being 9% to 23%, and 0.001% to 0.020% of silver computed as AgCl, the essential constituents totaling at least 84%, and up to 10% $Al_2O_3$ and up to 0.05% $CeO_2$, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the other portion substantially unchanged.

24. A glass article having a relief, intaglio or the like design and made by the method of claim 23.

25. The method of sculpturing or selectively etching an article comprising a body made of a reduced, transparent, photosensitively opacifiable glass comprising essentially 70–85% $SiO_2$, 9–15% $Li_2O$, up to 8% $K_2O$, and 0.001% to 0.020% of silver computed as AgCl, the essential constituents totaling at least 84%, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the other portion substantially unchanged.

26. A glass article having a relief, intaglio or the like design and made by the method of claim 25.

27. The method of sculpturing or selectively etching an article comprising a body made of a reduced, transparent, photosensitively opacifiable glass comprising essentially 70–85% $SiO_2$, 9–15% $Li_2O$, up to 8% $K_2O$ and 0.001% to 0.020% of silver computed as AgCl, the essential constituents totaling at least 84% and up to 10% Al₂O₃ and up to 0.05% CeO₂, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the other portion substantially unchanged.

28. A glass article having a relief, intaglio or the like design and made by the method of claim 27.

29. The method of sculpturing or selectively etching an article comprising a body made of a reduced, transparent, photo-sensitively opacifiable glass consisting essentially of 78–83% SiO₂, 10% to 13% Li₂O, 2% to 5% K₂O, up to 10% Al₂O₃, 0.001% to 0.020% of silver computed as AgCl and 0.005% to 0.05% CeO₂, which comprises exposing such article to short-wave radiations to form in a selected portion of the glass body a latent photographic image, heating the article to convert the latent image to an opacified image comprising opacifying crystallites of lithium monosilicate while leaving the remaining portion of the glass clear and unopacified, and treating the article with a dilute aqueous solution of hydrofluoric acid to dissolve the opacified portion while leaving the other portion substantially unchanged.

30. A glass article having a relief, intaglio or the like design and made by the method of claim 29.

31. The method of sculpturing or selectively etching an article comprising a body made of a reduced, transparent, photo-sensitively opacifiable glass comprising essentially 70–85% SiO₂, the indicated proportion of at least one alkali metal oxide selected from the group consisting of 9–15% Li₂O, up to 8% Na₂O, up to 8% K₂O and up to 8% of a mixture of Na₂O and K₂O, the selected alkali metal oxide including Li₂O, the total alkali metal oxide content being 9% to 23%, and 0.001% to 0.020% of silver computed as AgCl, the essential constituents totaling at least 84%, and up to 10% Al₂O₃, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the other portion substantially unchanged.

32. A glass article having a relief, intaglio or the like design and made by the method of claim 31.

33. The method of sculpturing or selectively etching an article comprising a body made of a reduced, transparent, photo-sensitively opacifiable glass comprising essentially 70–85% SiO₂, the indicated proportion of at least one alkali metal oxide selected from the group consisting of 9–15% Li₂O, up to 8% Na₂O, up to 8% K₂O and up to 8% of a mixture of Na₂O and K₂O, the selected alkali metal oxide including Li₂O, the total alkali metal oxide content being 9% to 23%, and 0.001% to 0.020% of silver computed as AgCl, the essential constituents totaling at least 84%, and up to 0.05% CeO₂, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the other portion substantially unchanged.

34. A glass article having a relief, intaglio or the like design and made by the method of claim 33.

35. The method of sculpturing or selectively etching an article comprising a body made of a reduced, transparent, photo-sensitively opacifiable glass comprising essentially 70–85% SiO₂, 9–15% Li₂O, up to 8% K₂O, and 0.001% to 0.020% of silver computed as AgCl, the essential constituents totaling at least 84%, and up to 10% Al₂O₃, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the other portion substantially unchanged.

36. A glass article having a relief, intaglio or the like design and made by the method of claim 35.

37. The method of sculpturing or selectively etching an article comprising a body made of a reduced, transparent, photo-sensitively opacifiable glass comprising essentially 70–85% SiO₂, 9–15% Li₂O, up to 8% K₂O, and 0.001% to 0.020% of silver computed as AgCl, the essential constituents totaling at least 84%, and up to 0.05% CeO₂, which comprises exposing such article to short-wave radiations to form in a selected portion of the glass body a latent photographic image, heating the article to convert the latent image to an opacified image comprising opacifying crystallites of a lithium silicate while leaving the remaining portion of the glass clear and unopacified, and treating the article with a dilute aqueous solution of hydrofluoric acid to dissolve the opacified portion while leaving the other portion substantially unchanged.

38. A glass article having a relief, intaglio or the like design and made by the method of claim 37.

STANLEY DONALD STOOKEY.

No references cited.